United States Patent [19]

Crane et al.

[11] 4,031,485

[45] June 21, 1977

[54] METHOD FOR ACHIEVING GAS DYNAMIC LASING

[75] Inventors: Robert Anthony Crane, Beaconsfield; Asoke Kumar Ghosh, Dollard des Ormeaux, both of Canada

[73] Assignee: RCA Corporation, New York, N.Y.

[22] Filed: Jan. 7, 1976

[21] Appl. No.: 647,005

[52] U.S. Cl. .................... 331/94.5 P; 331/94.5 G; 330/4.3
[51] Int. Cl.² ................... H01S 3/095; H01S 3/22
[58] Field of Search ................... 331/94.5; 330/4.3

[56] References Cited

UNITED STATES PATENTS 3,832,650  8/1974  Roberts ................... 331/94.5 G

OTHER PUBLICATIONS

Borghi et al., Applied Physics Letters, vol. 22, No. 12, June 15, 1973, pp. 661–663.
Hinchen et al., Applied Physics Letters, vol. 17, No. 9, Nov. 1, 1970, pp. 386–388.

*Primary Examiner*—Robert J. Webster
*Attorney, Agent, or Firm*—Glenn H. Bruestle; George E. Haas

[57] ABSTRACT

A laser device has a plasma discharge region for dissociating a diatomic gas into atoms. A nozzle connects the plasma discharge region with an optical cavity. The nozzle expands the plasma accelerating it to a supersonic velocity as it passes from the discharge region into the optical cavity. As the plasma passes through the nozzle, the dissociated atoms are recombined into molecules in a metastable energy state. The nozzle includes a gas injector for introducing a lasing gas into the plasma flow through the nozzle.

10 Claims, 3 Drawing Figures

METHOD FOR ACHIEVING GAS DYNAMIC LASING

BACKGROUND OF THE INVENTION

This invention relates to gas dynamic lasers and to the method of generating lasing using a gas flow.

Thermally pumped gas dynamic lasers utilize a gas flow to achieve the energy level population inversion necessary for lasing. A thermally pumped system begins with a hot equilibrium gas mixture in which there is no population inversion. The inversion is produced by rapid expansion of gas as it flows through a supersonic nozzle.

Both nitrogen and carbon dioxide are used in many gas dynamic lasers. The upper lasing energy level of the $CO_2$ is very near the first vibrational energy level of nitrogen. In one form of a nitrogen-$CO_2$ laser, an electrical arc plasma generator ionizes and heats the nitrogen. The gas is heated to about 2,000° K. The nitrogen is at equilibrium as it enters a nozzle. The molecular nitrogen is expanded through the nozzle reaching supersonic velocity after leaving the nozzle throat. The supersonic expansion "freezes" the vibrational energy states of the thermally excited nitrogen. Cold $CO_2$ is then injected into the gas flow downstream from the nozzle throat, where it mixes with the nitrogen ($N_2$ to $CO_2$ ratio of about 9:1) in the divergent exit portion of the nozzle. The molecules of nitrogen have been excited by the heating so that when the relatively cold $CO_2$ is injected into the nitrogen stream, selected excitation of the upper lasing levels of the $CO_2$ molecules occurs. The collision of the nitrogen and the $CO_2$ transfers excitation energy. Thus a population inversion in the upper lasing levels of the $CO_2$ is obtained. The excited $CO_2$ exits the nozzle into a chamber where lasing occurs as the energy is released in the form of light.

SUMMARY OF THE INVENTION

A gas dynamic laser has a plasma discharge region connected to an optical cavity by means of an expansion nozzle. The nozzle contains two injection means for introducing two different gases into the nozzle. A first multi-atomic molecular gas is dissociated in the plasma discharge region under high temperature and pressure. The gas is kinetically cooled by rapid expansion through the nozzle. Additional gas of the first type is introduced into the flow through the nozzle where it cools the hot dissociated gas causing it to recombine into a metastable energy state. A lasing gas is then injected into the flow of the metastable gas and is excited causing a population inversion of the upper lasing energy levels.

DETAILED DESCRIPTION OF THE INVENTION

Figure 1:
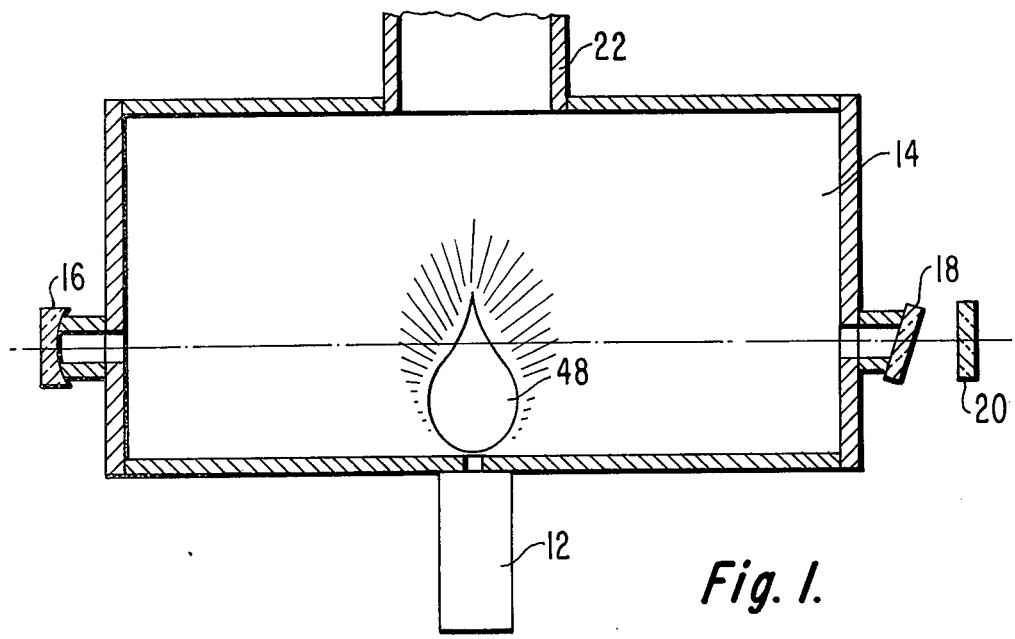
FIG. 1 is a cross sectional view of an arc jet laser.

With initial reference to FIG. 1, an arc jet laser has a plasma generator 12 and a lasing chamber 14. At opposite ends of the lasing chamber are a spherical mirror 16 and a window 18. A partially reflective flat mirror 20 is outside the lasing chamber 14 aligned with the window 18. The combination of the spherical mirror 16, the window 18 and the flat mirror 20 form a conventional optical laser cavity. The lasing chamber 14 also has an exhaust tubulation 22 through which gases may escape the chamber.

Figure 2:
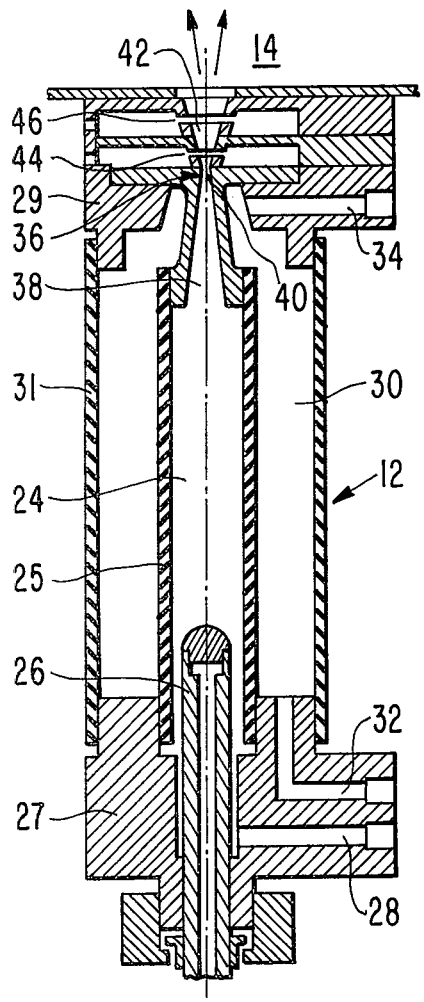
FIG. 2 is an enlarged sectional view of the plasma generator of the arc jet laser shown in FIG. 1.

The details of the plasma generator 12 are shown in FIG. 2. The generator 12 has a plasma discharge region 24 formed by a first tube 25 having two end blocks 27 and 29. An electrode 26 extends through one end block 27 into the discharge region 24. The electrode 26 may be hollow to permit a cooling fluid to circulate through the electrode. A gas inlet passage 28 extends through the one end block 27 into the discharge region 24. Surrounding the discharge region 24 and extending between the end blocks 27 and 29 is a second tube 31 forming coolant chamber 30. A coolant, such as water, flows through a passage 32 in the one end block 27 into the coolant chamber 30 and out through a passage 34 in the other end block 29. The coolant flow cools the walls of the plasma discharge region 24. At the end of the plasma discharge region having the other end block 29 is a nozzle 36. The nozzle 36 has a converging portion 38 which opens into the plasma discharge region 24 and narrows down to a throat 40. On the opposite side of the throat 40 from the converging portion 38 is a diverging portion 42 of the nozzle 36. Situated within the diverging portion 42 are first and second gas injector ports, 44 and 46 respectively, for introducing gas into the flow through the nozzle 36. The diverging portion 42 opens into the lasing chamber 14.

The operation of the arc jet gas dynamic laser provides a much higher degree of energy output than previous devices. A multi-atomic molecular gas, such as nitrogen, flows into the plasma discharge region 24 through the inlet passage 28. An electrical discharge between the electrode 26 and the nozzle 36 forms a gas plasma within the discharge region. Due to the arc discharge, the nitrogen within the discharge region is at a high pressure (2–20 atmospheres) and high temperature (7,000° to 12,000° K) which dissociates the gas molecules into atoms. The plasma generated by the electric discharge then flows through nozzle 36, where it is kinetically cooled by the rapid expansion through the nozzle 36, into the lasing chamber 14 which is at a relatively low pressure (e.g., 1 atmosphere). As the gas expands through the nozzle, cold gas of the same type as the plasma is introduced through the first gas injector port 44 into the flow. The cold gas can be at room temperature. The injection of the cold gas also cools the gas flowing through the nozzle so that it is now at a temperature of about 500° K. The rapid cooling of the dissociated gas and the injection of molecular gas in the nozzle results in the recombination of the dissociated gas into molecules in a metastable energy state. A lasing gas, such as carbon dioxide, is then introduced through the second gas injector port 46 into the gas flow. The combined flow of the metastable nitrogen and the carbon dioxide enters the lasing chamber 14 as shown by the flame-like configuration 48. The $CO_2$ molecules and the metastable nitrogen molecules collide with one another and energy is transferred from the nitrogen to the $CO_2$. Thus the $CO_2$ is excited so that the energy level population inversion occurs. As relaxation occurs from the upper energy level to the lower energy level of $CO_2$ light is emitted and lasing takes place within the lasing chamber.

Figure 3:
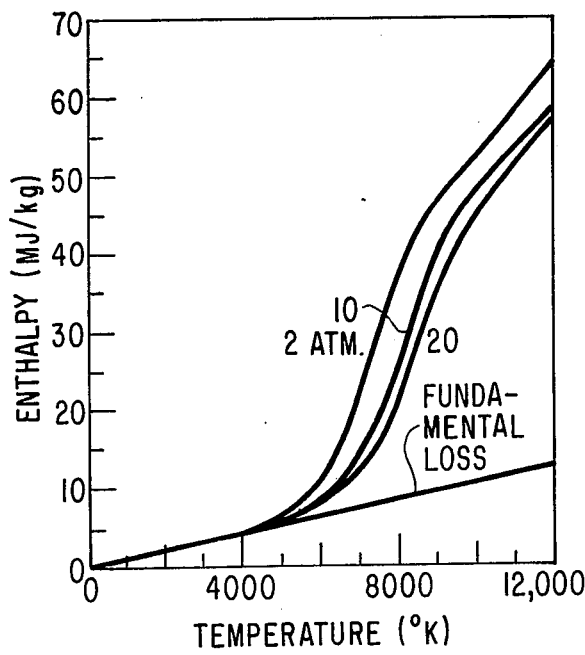
FIG. 3 is an enthalpy diagram of the arc jet laser.

The present invention offers several advantages over the prior art. By using a high temperature and high pressure plasma discharge to dissociate the gas molecules, higher energy can be put into the system resulting in a higher laser energy output. With reference to FIG. 3 the useful energy which is the difference between the total enthalpy in the gas and the fundamental enthalpy loss is greater in the present invention than in prior gas dynamic lasers. Conventional gas dynamic lasers utilize a plasma discharge at a temperature of about 2,000° K, the total enthalpy is very close to the level of fundamental loss. However, as the temperature increases, the total enthalpy rises at a faster rate than the fundamental loss. At the operating temperature of the present invention, 7,000° to 12,000° K, the useful energy is greater than 50 percent of the total enthalpy, whereas at 2,000° K, where conventional gas dynamic lasers operate, the useful energy is only about 6 percent of the total enthalpy. As the recombination occurs at low temperatures (about 500° K) within the nozzle 36, there is significant recovery of the kinetic energy of the nitrogen atoms, as well as the dissociation energy, into the metastable levels of the $CO_2$. This has the result of reducing the fundamental enthalpy loss to below that of the fundamental loss line of FIG. 3. Hence the overall efficiency of the arc jet laser is significantly better than previous gas dynamic lasers. Therefore, the plasma in the present invention has a higher energy content and can impart more energy to the lasing gas than in prior devices. In addition, the lasing chamber in the present arc jet laser is at 1 atmosphere whereas prior devices had to be maintained at low pressures 100 torr for example.

We claim:

1. A method for achieving dynamic laser emission comprising:
    dissociating molecules of a multi-atomic molecular first gas into atoms;
    recombining the dissociated atoms into molecules in a metastable energy state;
    mixing a second gas with the recombined molecules to form an active laser gas mixture having a population inversion; and
    injecting the gas mixture into an optical laser cavity.

2. The method as in claim 1 wherein the dissociation of the first gas is accomplished by exposing the first gas to an electric arc discharge to dissociate the gas under high temperature and pressure.

3. The method as in claim 2 wherein the temperature during dissociation is between 7,000° and 12,000° K.

4. The method as in claim 2 wherein the pressure during dissociation is between 2 and 20 atmospheres.

5. The method as in claim 1 wherein the recombining of the dissociated atoms is achieved by rapidly cooling the gas.

6. The method as in claim 5 wherein gas is rapidly cooled by expanding the dissociated gas through a nozzle having a converging section, a throat and a diverging section so as to impart a supersonic velocity to the gas flow through the nozzle.

7. The method as in claim 6 wherein the rapid cooling further includes injecting an additional quantity of the first gas into the flow through the nozzle, the additional quantity of the first gas being at a lower temperature than the flow through the nozzle.

8. The method as in claim 7 wherein the additional quantity of the first gas is at room temperature.

9. The method as in claim 6 wherein the rapid cooling further includes injecting an additional quantity of the first gas into the gas flow through the diverging section of the nozzle, the additional quantity of the first gas being at a lower temperature than the flow through the nozzle.

10. The method as in claim 6 wherein the second gas is mixed with the recombined molecules in the diverging section of the nozzle.

* * * * *